(12) United States Patent
Cai et al.

(10) Patent No.: US 11,054,595 B1
(45) Date of Patent: Jul. 6, 2021

(54) OPTICAL SIGNAL TRANSMISSION DEVICE

(71) Applicant: BLOVELIGHT (GUANGDONG) INTELLIGENT TECHNOLOGY CO., LTD., Dongguan (CN)

(72) Inventors: Xinde Cai, Zhuzhou (CN); Jianbo Lan, Luzhou (CN)

(73) Assignee: BLOVELIGHT (GUANGDONG) INTELLIGENT TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 16/810,593

(22) Filed: Mar. 5, 2020

(30) Foreign Application Priority Data

Dec. 30, 2019 (CN) .......................... 201911397626.X

(51) Int. Cl.
*G02B 6/42* (2006.01)
*G02B 6/38* (2006.01)
*G02B 6/40* (2006.01)

(52) U.S. Cl.
CPC ........... *G02B 6/4292* (2013.01); *G02B 6/428* (2013.01); *G02B 6/4214* (2013.01); *G02B 6/3855* (2013.01); *G02B 6/40* (2013.01); *G02B 6/4243* (2013.01); *G02B 6/4244* (2013.01)

(58) Field of Classification Search
None
See application file for complete search history.

(56) References Cited

U.S. PATENT DOCUMENTS

| | | | | |
|---|---|---|---|---|
| 7,150,569 B2 * | 12/2006 | Oono | ................... | G02B 6/4206 385/88 |
| 7,726,885 B2 * | 6/2010 | Nishimura | ........... | G02B 6/4292 385/78 |
| 2008/0226228 A1 * | 9/2008 | Tamura | ................ | G02B 6/4214 385/33 |
| 2012/0027346 A1 * | 2/2012 | Castagna | ............. | G02B 6/4224 385/33 |
| 2012/0213475 A1 * | 8/2012 | Selli | ..................... | G02B 6/4228 385/33 |
| 2013/0216190 A1 * | 8/2013 | Haley | .................... | G02B 6/423 385/79 |
| 2013/0230280 A1 * | 9/2013 | Kadar-Kallen | ...... | G02B 6/4214 385/33 |
| 2015/0063760 A1 * | 3/2015 | Pommer | .............. | G02B 6/4292 385/79 |
| 2015/0260929 A1 * | 9/2015 | Matsumaru | .......... | G02B 6/4292 385/52 |
| 2015/0277066 A1 * | 10/2015 | Nakagawa | ............. | G02B 6/125 385/33 |

(Continued)

*Primary Examiner* — Jerry Rahll
(74) *Attorney, Agent, or Firm* — Dragon Sun Law Firm, PC; Jinggao Li, Esq.

(57) ABSTRACT

The present invention provides an optical signal transmission device, including a lens base, a cover plate, an optical fiber plug and a printed circuit board (PCB), wherein an insert block is formed at a front end of the optical fiber plug, and a plurality of optical fibers penetrate the optical fiber plug; a socket is provided at a rear end of the lens base, the insert block is inserted into the socket and the two closely cooperate with each other; a recess is provided in the top of the lens base, and a reflective bevel is formed on the inner wall of the recess; and the cover plate is stacked on the top of the lens base, downwardly-extending fastening plates are respectively formed at peripheral edges of the cover plate.

17 Claims, 9 Drawing Sheets

(56) References Cited

U.S. PATENT DOCUMENTS

| | | | | |
|---|---|---|---|---|
| 2016/0231521 A1* | 8/2016 | Smith | ................... | G02B 6/4214 |
| 2019/0331858 A1* | 10/2019 | Leigh | ................... | G02B 6/4214 |
| 2019/0346638 A1* | 11/2019 | Suehiro | ................ | G02B 6/4226 |
| 2020/0012056 A1* | 1/2020 | Lian | ..................... | G02B 6/4204 |
| 2020/0326495 A1* | 10/2020 | Liao | ..................... | G02B 6/4214 |

* cited by examiner

OPTICAL SIGNAL TRANSMISSION DEVICE

CROSS-REFERENCE TO RELATED PATENT APPLICATION

This application claims priority to and the benefit of 201911397626.X, filed Dec. 30, 2019, entitled "Optical signal transmission device," by Xinde Cai et al. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to the technical field of laser signal transmission, and particularly to an optical signal transmission device.

BACKGROUND ART

During the transmission of laser signals, how to accurately transmit the laser signals between a laser and an optical fiber is a key problem in the prior art. The exiting optical signal transmission products mainly have the following disadvantages. First, after an optical fiber connector is assembled, the phenomenon of upward and downward shift will occur, resulting in fluctuations in optical data and even performance degradation. Moreover, during long-term use, the components of the optical signal transmission device are prone to deformation, resulting in a reduced optical signal conduction performance. In addition, in order to prevent the failure of optical signal transmission due to the structural deformation, the intervals between the optical fibers and between lenses are large, resulting in a large overall size of the optical signal transmission device, which cannot meet the design requirements of miniaturization and small size.

Therefore, a heretofore unaddressed need exists in the art to address the aforementioned deficiencies and inadequacies.

SUMMARY OF THE INVENTION

In view of the disadvantages of the prior art, the technical problem to be solved by the present invention is to provide an optical signal transmission device with a compact structure, a strong stability and small dimensions.

In order to solve the above technical problem, the present invention adopts the following technical solution.

An optical signal transmission device, includes a lens base, a cover plate, an optical fiber plug and a printed circuit board (PCB), wherein an insert block is formed at a front end of the optical fiber plug, a plurality of optical fibers penetrate the optical fiber plug, and end faces of the optical fibers extend toward a front side of the insert block or are flush with a front end face of the insert block; a socket is provided at a rear end of the lens base, the insert block is inserted into the socket and the two closely cooperate with each other; a recess is provided in the top of the lens base, and a reflective bevel is formed on the inner wall of the recess; the PCB is stacked on the bottom of the lens base, a laser is provided on the PCB, the end faces of the optical fibers and the laser both face the reflective bevel, a laser beam emitted from the laser is reflected to the end faces of the optical fibers by the reflective bevel, and optical signals are transmitted to the outside by means of the optical fibers; and the cover plate is stacked on the top of the lens base, downwardly-extending fastening plates are respectively formed at peripheral edges of the cover plate, the plurality of fastening plates respectively abut against a front end of the lens base, a left side of the lens base, a right side of the lens base and a rear end of the optical fiber plug, and the lens base and the optical fiber plug are secured by means of the cover plate and the plurality of fastening plates.

Preferably, two support arms are formed at the rear end of the lens base, the two support arms are respectively provided on the left and right sides of the socket, and the optical fiber plug is sandwiched between the two support arms.

Preferably, slots are formed on inner sides of the support arms, outwardly-protruding guide blocks are respectively formed on the left and right sides of the optical fiber plug, the guide blocks are aligned with the slots on a one-to-one basis, the guide blocks are inserted into the slots and the two closely cooperate with each other.

Preferably, the guide blocks are elongated, and the guide blocks extend in a front and back direction of the optical fiber plug.

Preferably, a plurality of optical fiber insertion holes arranged side by side are formed in the optical fiber plug, and the plurality of optical fibers respectively pass through the plurality of optical fiber insertion holes.

Preferably, optical fiber guide slots are formed on the optical fiber plug, the optical fiber guide slots are aligned with the optical fiber insertion holes on a one-to-one basis, and the optical fiber guide slots are in communication with the rear ends of the optical fiber insertion holes.

Preferably, a bottom recess is formed on a lower end face of the lens base, the PCB covers the bottom recess, and the laser is located inside the bottom recess.

Preferably, the lens base comprises a plurality of first lenses arranged side by side, the plurality of first lenses are all located inside the socket, the first lenses are aligned with the optical fibers on a one-to-one basis, and the first lenses protrude in the direction of the end faces of the optical fibers.

Preferably, the lens base comprises a plurality of second lenses arranged side by side, the second lenses are located inside the bottom recess, the second lenses are aligned with the optical fibers on a one-to-one basis, and the second lenses protrude in the direction of the laser.

Preferably, the cover plate is made of plastic or metal.

In the optical signal transmission device disclosed by the present invention, through the cooperation of the insert block and the socket, the optical fiber plug can be aligned with and inserted into the lens base to align the optical fibers on the optical fiber plug with transmission channels in the lens base, and the lens base and the optical fiber plug are then secured by using the covering effect of the cover plate and the gripping effect of the plurality of fastening plates, such that the lens base and the optical fiber plug are tightly jointed. Compared with the prior art, the optical signal transmission device of the present invention has a more compact structure and a stronger stability during use. On the basis of the stable and reliable structure, large intervals for the plurality of optical fibers are not required in the present invention, so that the present invention has smaller dimensions and meets the application requirements of miniaturization and small size.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF EMBODIMENTS

Figure 1:
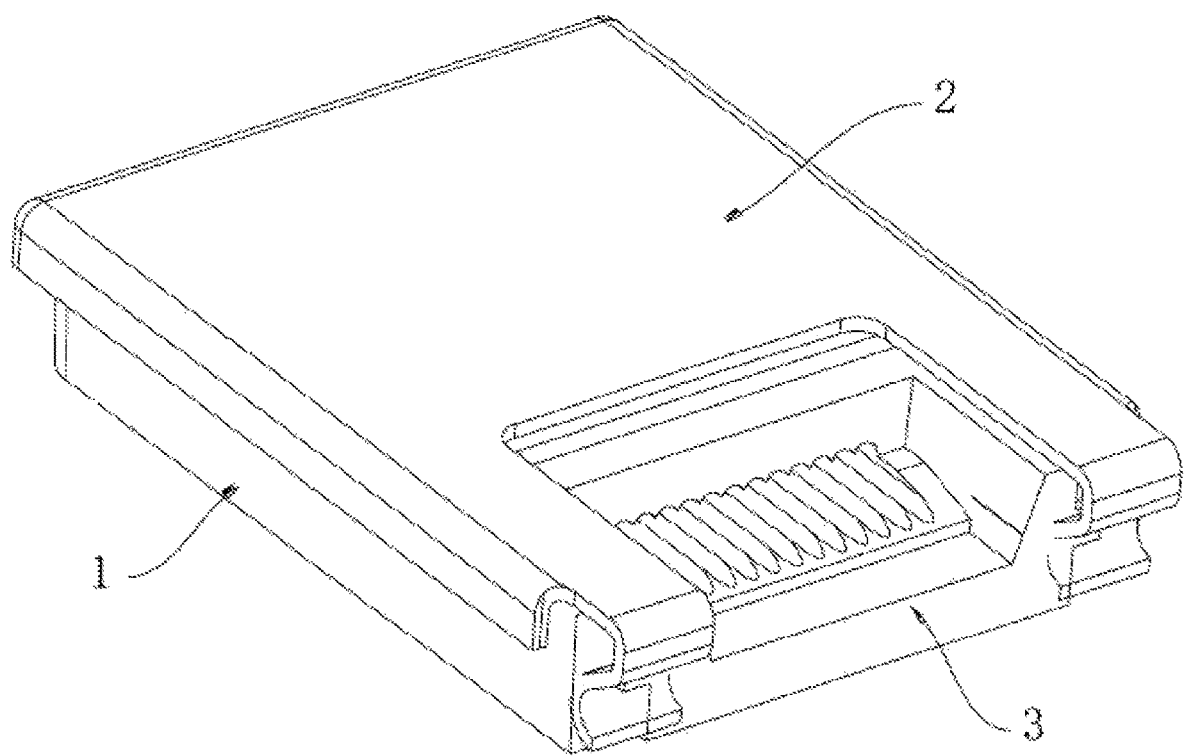
FIG. 1 is a perspective view of an optical signal transmission device in a first embodiment of the present invention.
Figure 2:
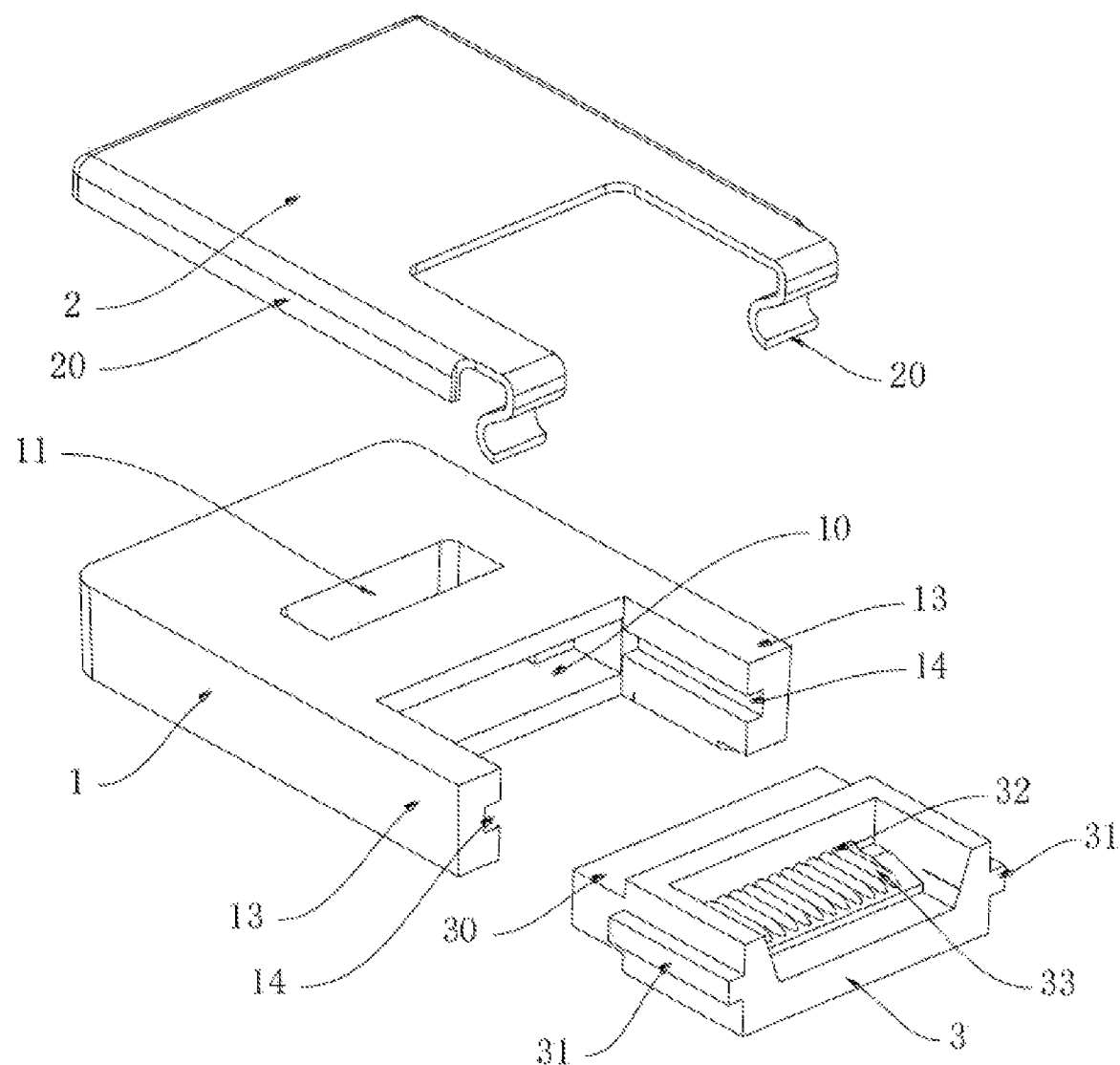
FIG. 2 is a first exploded view of the optical signal transmission device in the first embodiment of the present invention.
Figure 3:
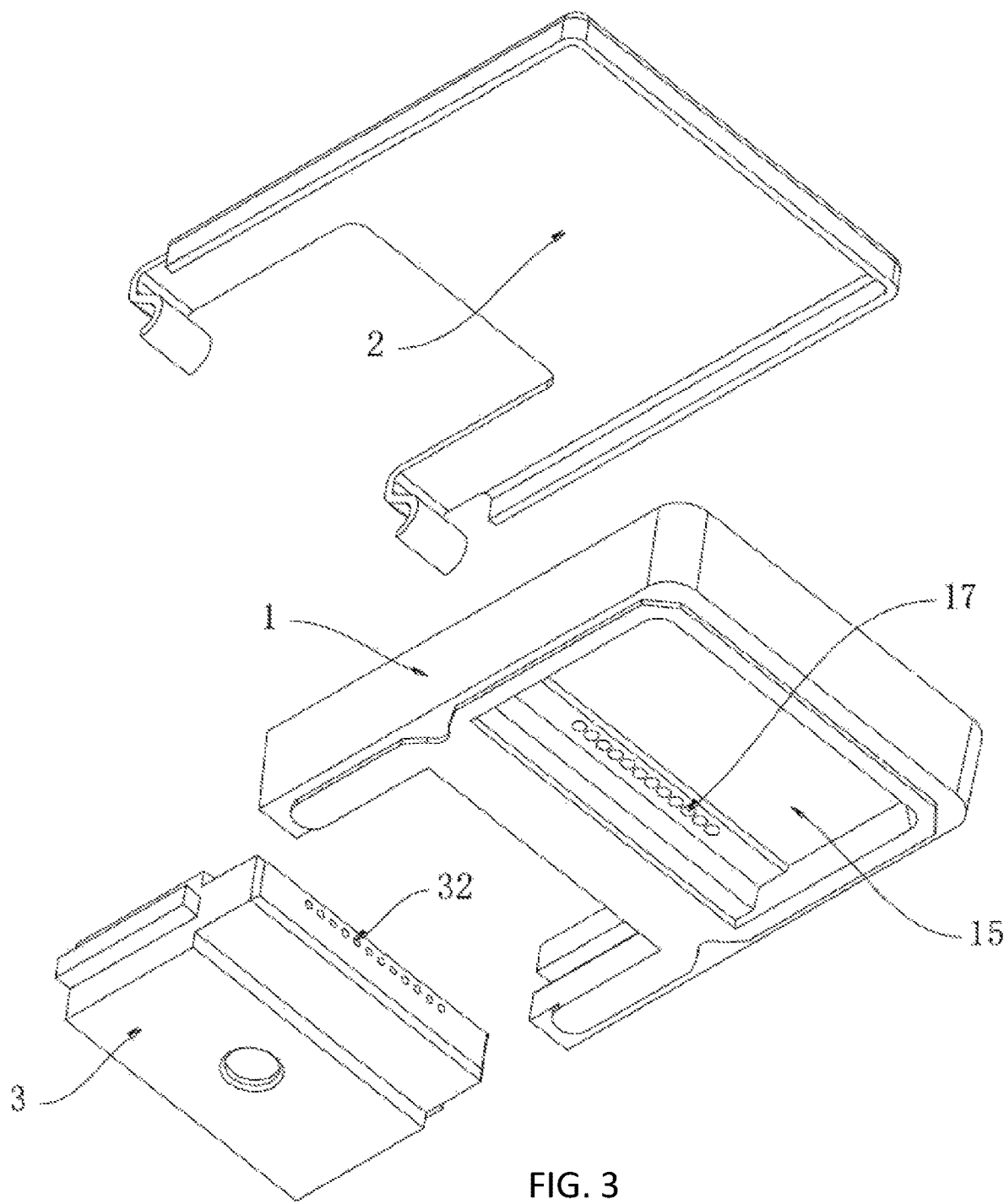
FIG. 3 is a second exploded view of the optical signal transmission device in the first embodiment of the present invention.
Figure 4:
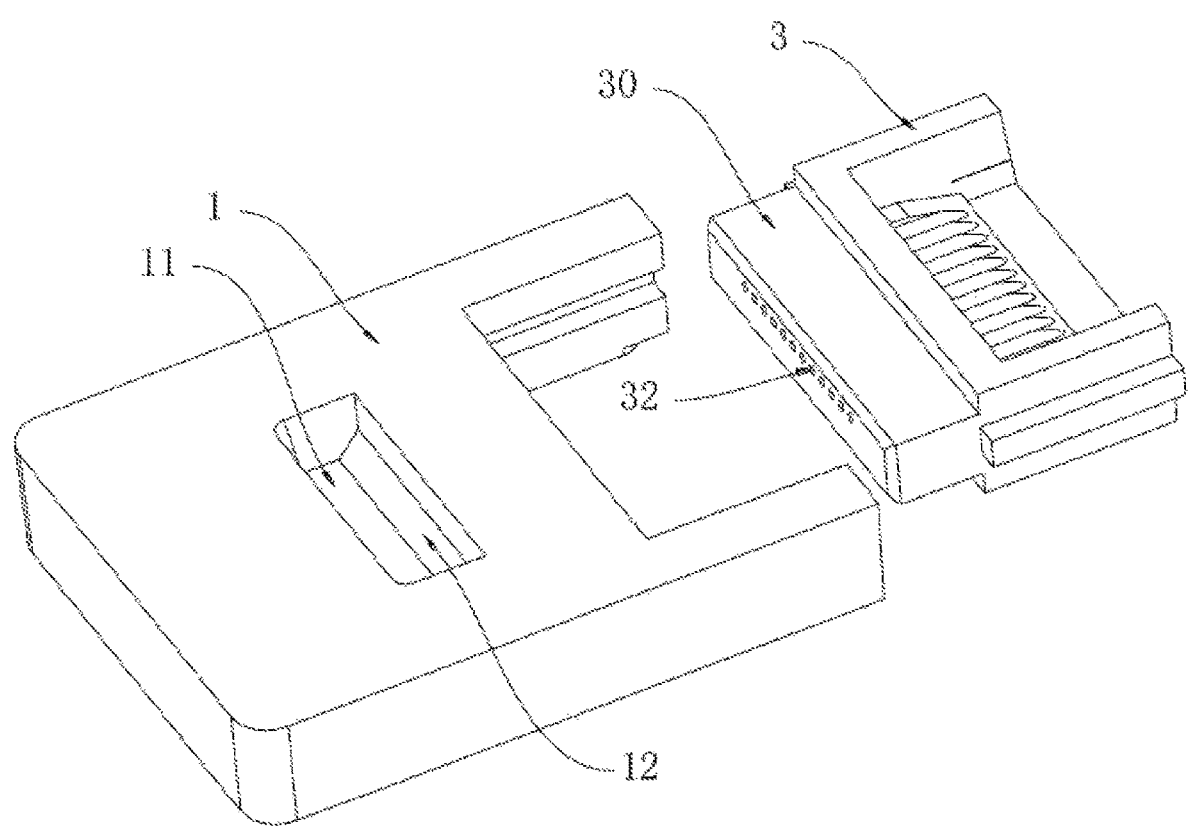
FIG. 4 is a structural diagram of a lens base and an optical fiber plug in the first embodiment of the present invention.
Figure 5:
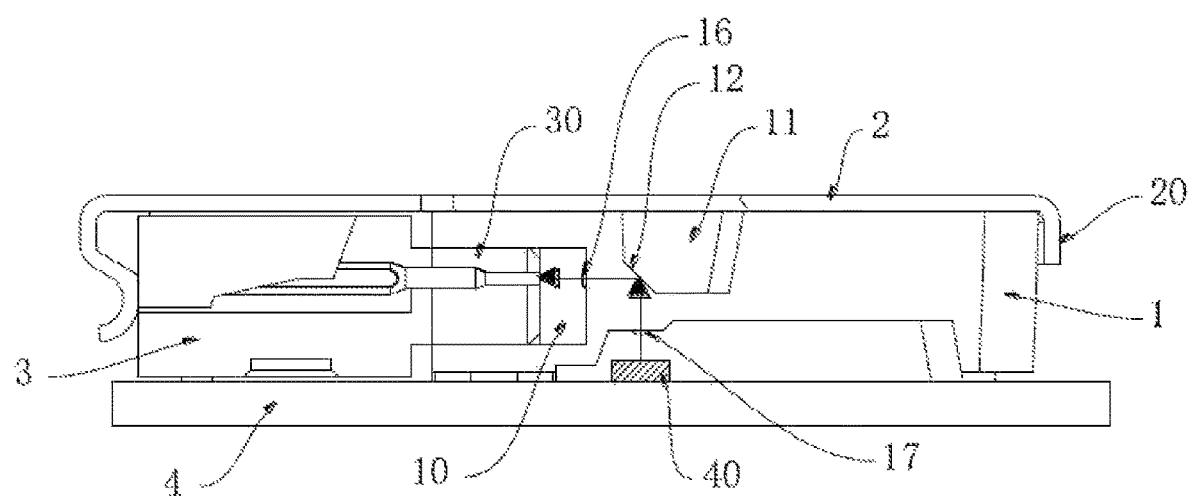
FIG. 5 is a cross-sectional view of the optical signal transmission device in the first embodiment of the present invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

First Embodiment

This embodiment discloses an optical signal transmission device, which, as shown in FIGS. 1 to 5, comprises a lens base 1, a cover plate 2, an optical fiber plug 3 and a printed circuit board (PCB) 4. An insert block 30 is formed at a front end of the optical fiber plug 3, a plurality of optical fibers penetrate the optical fiber plug 3, and end faces of the optical fibers extend toward a front side of the insert block 30 or are flush with a front end face of the insert block 30. A socket 10 is provided at a rear end of the lens base 1, the insert block 30 is inserted into the socket 10 and the two closely cooperate with each other. A recess 11 is provided in the top of the lens base 1, and a reflective bevel 12 is formed on an inner wall of the recess 11. The PCB 4 is stacked on the bottom of the lens base 1, a laser 40 is provided on the PCB 4, the end faces of the optical fibers and the laser 40 both face the reflective bevel 12, a laser beam emitted from the laser 40 is reflected to the end faces of the optical fibers by the reflective bevel 12, and optical signals are transmitted to the outside by means of the optical fibers. The cover plate 2 is stacked on the top of the lens base 1, downwardly-extending fastening plates 20 are respectively formed at peripheral edges of the cover plate 2, the plurality of fastening plates 20 respectively abut against a front end of the lens base 1, a left side of the lens base 1, a right side of the lens base 1 and a rear end of the optical fiber plug 3, and the lens base 1 and the optical fiber plug 3 are secured by means of the cover plate 2 and the plurality of fastening plates 20.

In the above device, through the cooperation of the insert block 30 and the socket 10, the optical fiber plug 3 can be aligned with and inserted into the lens base 1 to align the optical fibers on the optical fiber plug 3 with transmission channels in the lens base 1, and the lens base 1 and the optical fiber plug 3 are then secured by using the covering effect of the cover plate 2 and the gripping effect of the plurality of fastening plates 20, such that the lens base 1 and the optical fiber plug 3 are tightly jointed. Compared with the prior art, the optical signal transmission device of the present invention has a more compact structure and a stronger stability during use. On the basis of the stable and reliable structure, large intervals for the plurality of optical fibers are not required in the present invention, so that the present invention has smaller dimensions and meets the application requirements of miniaturization and small size.

In order to grip the optical fiber plug 3 on two sides, two support arms 13 are formed at the rear end of the lens base 1 in this embodiment. The two support arms 13 are respectively provided on the left and right sides of the socket 10, and the optical fiber plug 3 is sandwiched between the two support arms 13.

Guide blocks and slots are preferably used in this embodiment to improve the accuracy of insertion and the structural compactness. Specifically, slots 14 are formed on inner sides of the support arms 13, outwardly-protruding guide blocks 31 are respectively formed on the left and right sides of the optical fiber plug 3, the guide blocks 31 are aligned with the slots 14 on a one-to-one basis, the guide blocks 31 are inserted into the slots 14 and the two closely cooperate with each other.

As a preferred manner, the guide blocks 31 are elongated, and the guide blocks 31 extend in a front and back direction of the optical fiber plug 3.

In order to facilitate the penetration of the optical fibers, a plurality of optical fiber insertion holes 32 arranged side by side are formed in the optical fiber plug 3 in this embodiment, and the plurality of optical fibers respectively pass through the plurality of optical fiber insertion holes 32.

In this embodiment, a cladding layer for the optical fibers has accommodation and guide functions at the rear end.

Specifically, optical fiber guide slots 33 are formed on the optical fiber plug 3, the optical fiber guide slots 33 are aligned with the optical fiber insertion holes 32 on a one-to-one basis, and the optical fiber guide slots 33 are in communication with the rear ends of the optical fiber insertion holes 32.

As a preferred manner, a bottom recess 15 is formed on a lower end face of the lens base 1, the PCB 4 covers the bottom recess 15, and the laser 40 is located inside the bottom recess 15. The above structure can ensure the effective transmission of laser signals.

In this embodiment, the lens base 1 comprises a plurality of first lenses 16 arranged side by side, the plurality of first lenses 16 are all located inside the socket 10, the first lenses 16 are aligned with the optical fibers on a one-to-one basis, and the first lenses 16 protrude in the direction of the end faces of the optical fibers.

Further, the lens base 1 comprises a plurality of second lenses 17 arranged side by side, the second lenses 17 are located inside the bottom recess 15, the second lenses 17 are aligned with the optical fibers on a one-to-one basis, and the second lenses 17 protrude in the direction of the laser 40.

Under the action of the plurality of first lenses 16 and the plurality of second lenses 17, the laser beam can be effectively collimated and focused, thereby improving the accuracy of optical signal transmission.

In practical applications, the cover plate 2 is made of plastic or metal.

Further, the fastening plates 20 abutting against the rear end of the optical fiber plug 3 are arc-shaped elastic fastening plates.

In addition, the plurality of optical fiber insertion holes 32 are arranged in sequence from left to right, and the plurality of optical fiber insertion holes 32 are laterally communicated in sequence.

The optical signal transmission device disclosed by the present invention is mainly used in a laser communication device or module, and is a core component. Its operating principle includes: laser light excited by the laser is collimated and focused by the optical assembly, and two or more optical fibers are used at a receiving end to collect and transmit the focused laser light. Compared with the prior art, by means of the optical assembly, the present invention can greatly improve the focusing efficiency of laser light by the optical fibers; the special structure of the product makes the performance very stable, thereby reducing rework and rejects during the production process; and fasteners made of metal or plastic are provided in the present invention, such that the whole system can be more stable and reliable, the plastic can be effectively prevented from invading an optical area at the low-temperature injection link at the rear end, and the reliability of the system is ensured. In addition, fastening parts are designed for the fasteners made of metal or plastic to apply a pressure from the optical fiber plug (JUMPER) to a cut-off face of the lens base (lens), so as to ensure the coupled state of the assembly.

On this basis, a chute structure is used for the cooperation between the optical fiber plug and the lens base of the product. During assembly, a bracket of the optical fiber plug is slid into the lens base from the front part thereof. An optical cut-off face is provided at the focal position of the fiber end of the lens base product, the optical fiber plug is inserted until reaching the cut-off face, and the focal length is controlled by means of optical design simulation. In addition, the lens base is in interference fit with the optical fiber plug product, and the fitting stability is increased by accurate positioning on four sides.

Second Embodiment

Figure 6:
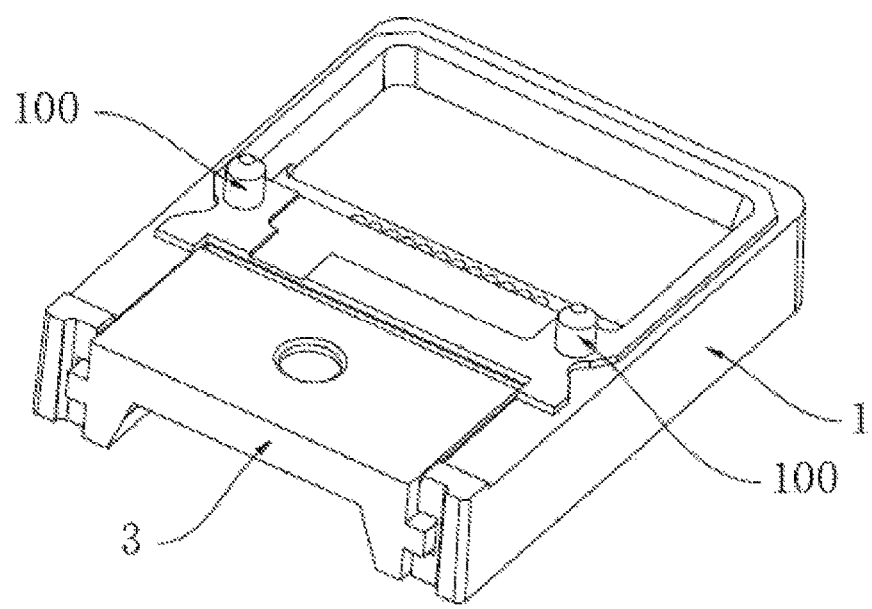
FIG. 6 is a perspective view of an optical signal transmission device in a second embodiment of the present invention.

Referring to FIG. 6, this embodiment is different from the first embodiment in that two downwardly-extending positioning posts 100 are formed at the bottom of the lens base 1, and the two positioning posts 100 are respectively close to the left and right ends of the lens base 1.

The two positioning posts 100 have the effect that when the lens base 1 is assembled and coupled with the PCB 4, the two positioning posts 100 can be used for preliminary positioning, which can effectively reduce the production time. In addition, after an adhesive is applied to the product, the two positioning posts 100 also have the effect of increasing the strength, so that the overall performance of the present invention is stronger.

Third Embodiment

Figure 7:
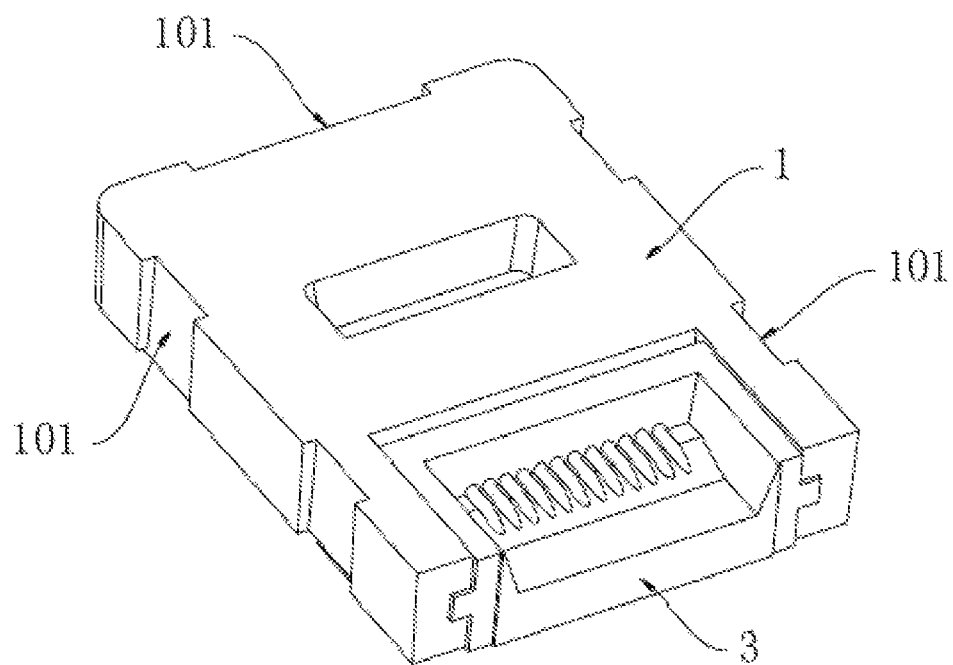
FIG. 7 is a perspective view of an optical signal transmission device in a third embodiment of the present invention.

Referring to FIG. 7, this embodiment is different from the first embodiment in that grooves 101 are respectively formed on three outer side walls of the lens base 1.

The grooves 101 are preferably structurally added in this embodiment, and in actual applications, the stability of the product after the adhesive is applied can be effectively enhanced under the action of the grooves 101 to facilitate gripping and fixing the lens base 1.

Fourth Embodiment

Figure 8:
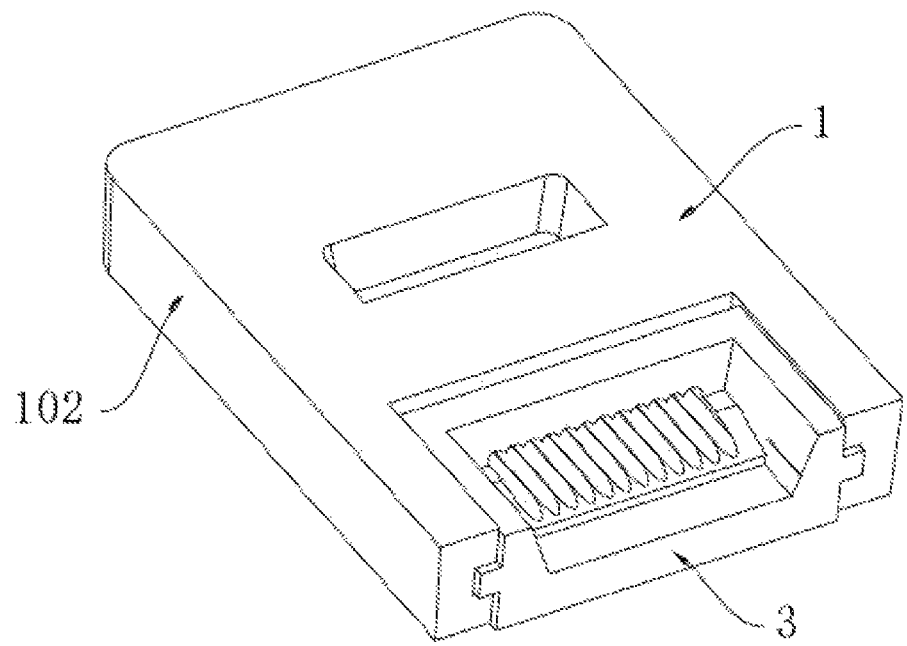
FIG. 8 is a perspective view of an optical signal transmission device in a fourth embodiment of the present invention.

Referring to FIG. 8, as an alternative to the third embodiment, smooth side walls 102 are formed on the outer side of the lens base 1 in this embodiment.

Each outer side wall of the lens base 1 with the above structure has a flat structure, thereby meeting different application occasions.

Fifth Embodiment

Figure 9:
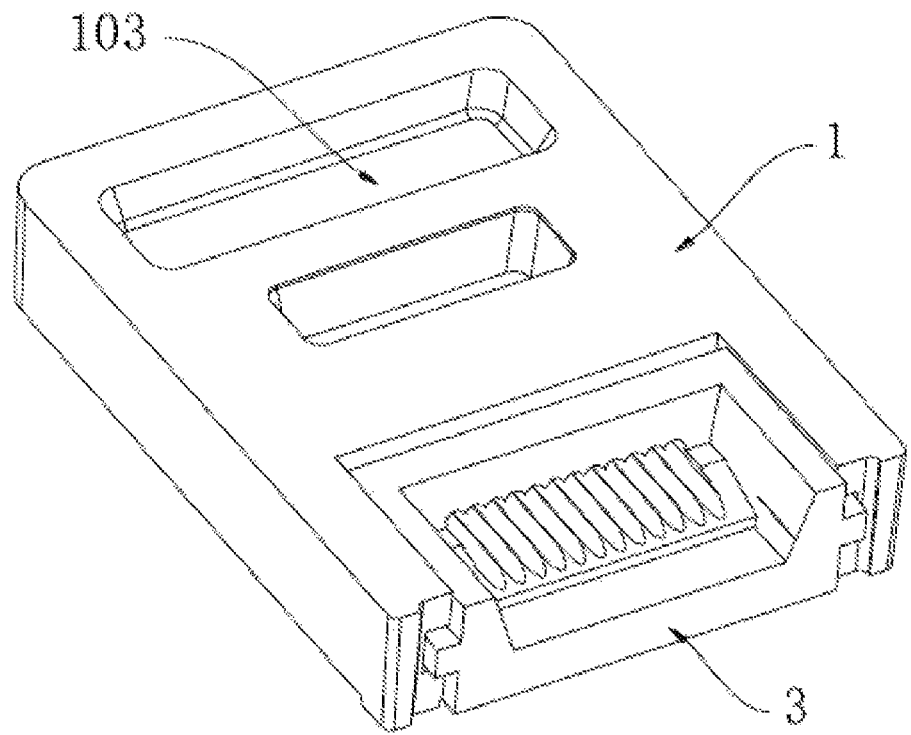
FIG. 9 is a perspective view of an optical signal transmission device in a fifth embodiment of the present invention.

Referring to FIG. 9, this embodiment is different from the first embodiment in that an adhesive escape groove 103 is formed on the top of the lens base 1, the adhesive escape groove 103 is elongated, and the adhesive escape groove 103 extends in the width direction of the lens base 1.

Adhesive escape in the above structure is also referred to as adhesive extraction. In this embodiment, the adhesive escape groove 103 is provided to facilitate processing and molding of the lens base 1.

Sixth Embodiment

Figure 10:
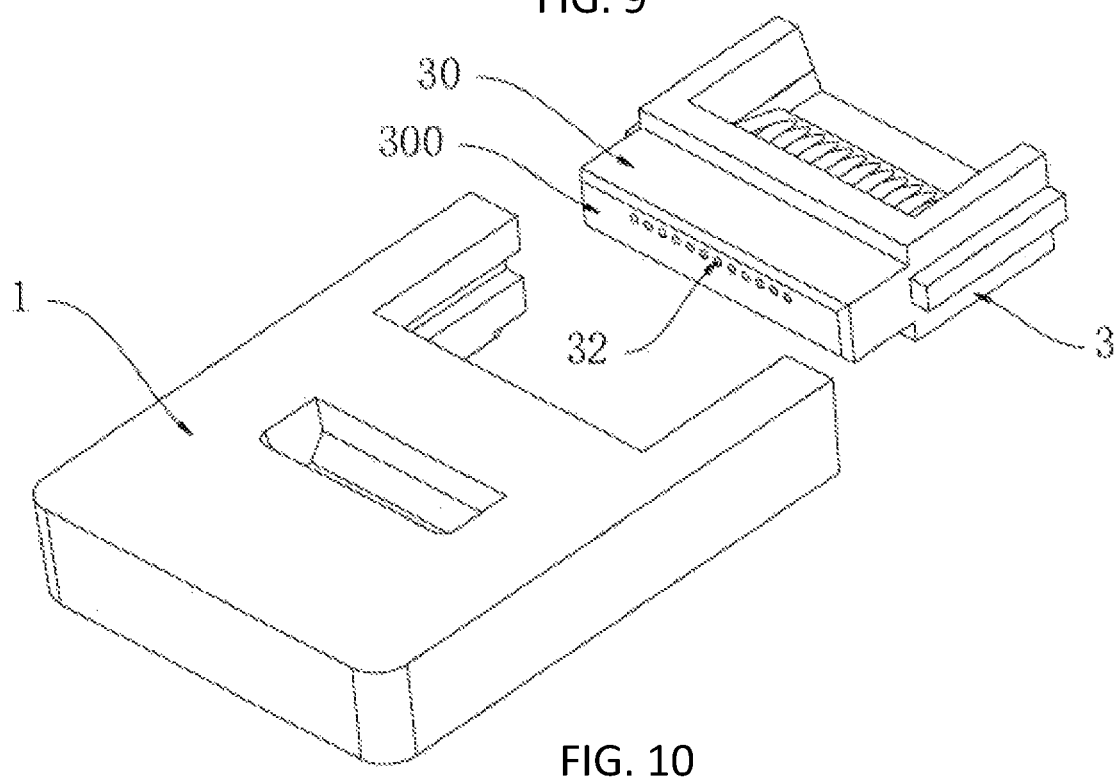
FIG. 10 is a structural diagram of a lens base and an optical fiber plug in a sixth embodiment of the present invention.

Referring to FIG. 10, a planar portion 300 is formed on the front end face of the insert block 30 in this embodiment.

The planar portion 300 has the effect that when the optical fibers penetrate out of the optical fiber insertion holes 32, the ends of the optical fibers can be conveniently ground, so that the end faces of the optical fibers meet a certain flatness requirement.

Seventh Embodiment

Figure 11:
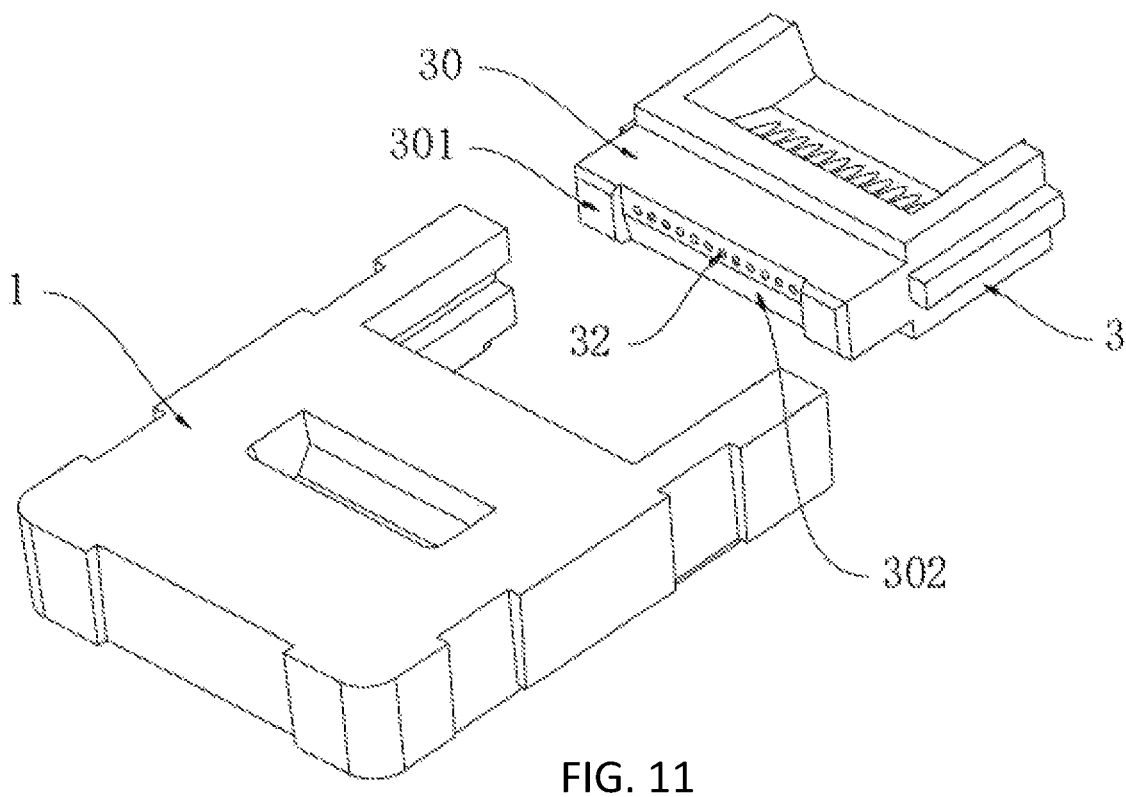
FIG. 11 is a structural diagram of a lens base and an optical fiber plug in a seventh embodiment of the present invention.

Referring to FIG. 11, this embodiment is different from the first embodiment in that two protruding blocks 301 are formed on the front end face of the insert block 30, the two protruding blocks 301 are respectively located at the left and right ends of the insert block 30, and the optical fiber insertion holes 32 are located between the two protruding blocks 301.

In this embodiment, since the two protruding blocks 301 are formed on the front end face of the insert block 30, an opening structure is formed between the two protruding blocks 301; and the plurality of optical fiber insertion holes 32 are provided in the opening. Based on the above structural characteristics, the optical fibers passing through the optical fiber insertion holes 32 are preferably machined by laser cutting, such that the optical fibers have flat end faces.

Further, a downwardly-inclined avoiding bevel 302 may also be provided on the front end face of the insert block 30, and the avoiding bevel 302 is located below the plurality of optical fiber insertion holes 32. The avoiding bevel 302 can avoid a laser beam during laser cutting, which facilitates the laser cutting.

Eighth Embodiment

Figure 12:
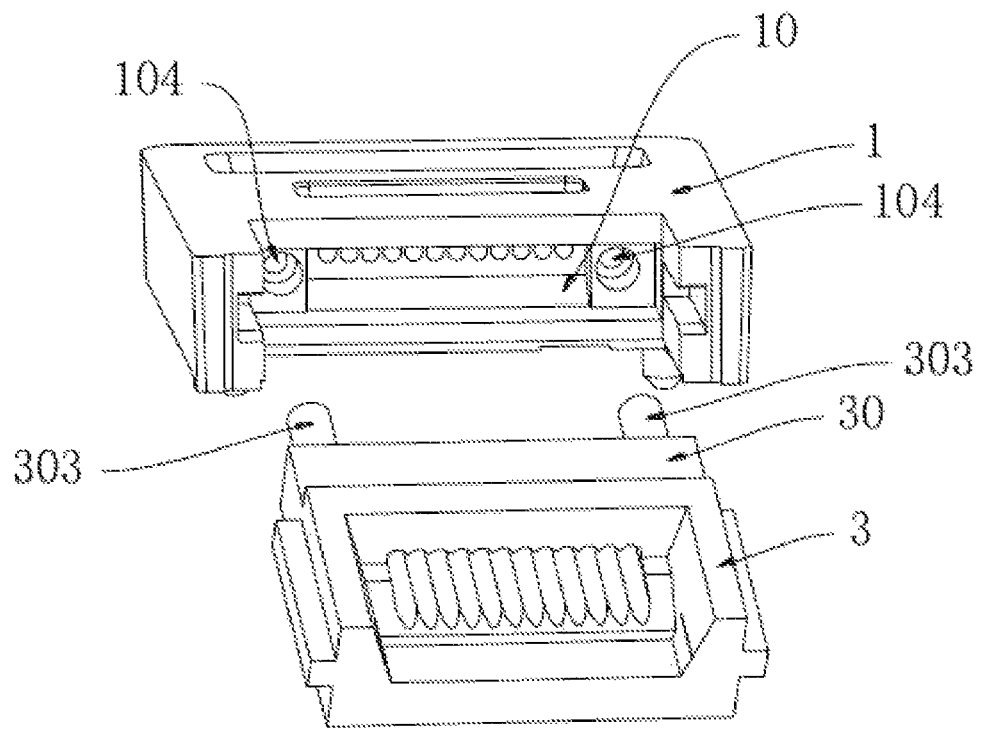
FIG. 12 is a structural diagram of a lens base and an optical fiber plug in an eighth embodiment of the present invention.

Referring to FIG. 12, this embodiment is different from the first embodiment in that two positioning jacks 104 are formed in the socket 10, the two positioning jacks 104 are respectively close to the left and right ends of the socket 10, two forwardly-protruding positioning pins 303 are formed on the front end face of the insert block 30, the positioning pins 303 are aligned with the positioning jacks 104 on a one-to-one basis, and the positioning pins 303 are inserted into and cooperate with the positioning jacks 104.

Under the cooperation of the positioning pins 303 and the positioning jacks 104, when the insert block 30 is inserted into the socket 10, the lens base 1 and the optical fiber plug 3 can be guided and positioned, and the lens base 1 can also match the optical fiber plug 3 more stably.

Ninth Embodiment

Figure 13:
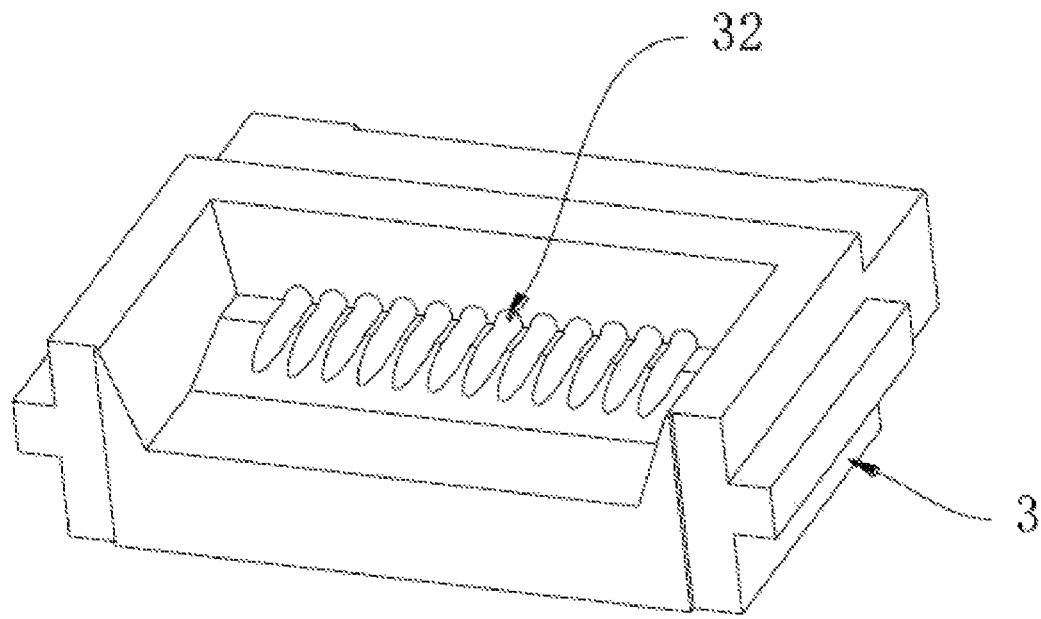
FIG. 13 is a structural diagram of an optical fiber plug in a ninth embodiment of the present invention.

Referring to FIG. 13, in this embodiment, the optical fiber insertion holes 32 are separate through holes, and a gap is provided between two adjacent optical fiber insertion holes 32.

The optical fiber insertion holes 32 of the above structure can meet the application requirements for the separate passage of the optical fibers.

Tenth Embodiment

Figure 14:
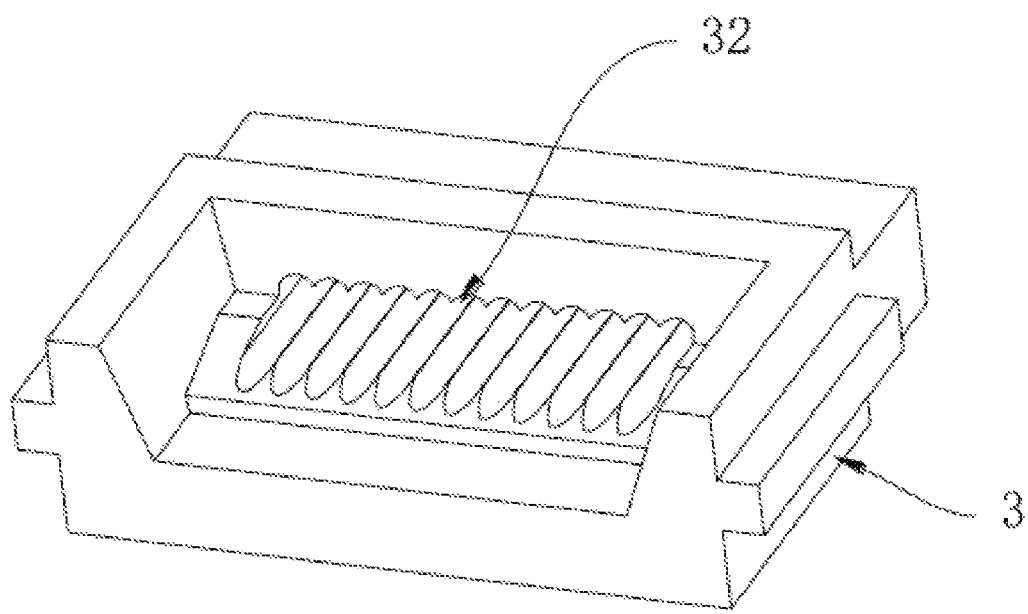
FIG. 14 is a structural diagram of an optical fiber plug in a tenth embodiment of the present invention.

Referring to FIG. 14, as an alternative to the ninth embodiment, side portions of two adjacent optical fiber insertion holes 32 are in communication with each other in this embodiment.

In the above structure, the plurality of optical fiber insertion holes 32 are in a shape in which they are continuous and communicated in sequence. In this embodiment, the intervals between the plurality of optical fibers can be further reduced, so that the plurality of optical fibers are inserted into the optical fiber plug 3 more compactly.

The above embodiments are merely preferred embodiments of the present invention but not intended to limit the present invention, and any modifications, equivalent replacements, improvements, etc. made within the technical scope of the present invention should be included within the scope of protection of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is the claimed is:

1. An optical signal transmission device, comprising a lens base, a cover plate, an optical fiber plug and a PCB, wherein an insert block is formed at a front end of the optical fiber plug, a plurality of optical fibers penetrate the optical fiber plug, and end faces of the optical fibers extend toward a front side of the insert block or are flush with a front end face of the insert block; a socket is provided at a rear end of the lens base, the insert block is inserted into the socket and the two with each other; a recess is provided in the top of the lens base, and a reflective bevel is formed on the inner wall of the recess; the PCB is stacked on the bottom of the lens base, a laser is provided on the PCB, the end faces of the optical fibers and the laser both face the reflective bevel, a laser beam emitted from the laser is reflected to the end faces of the optical fibers by the reflective bevel, and optical signals are transmitted to the outside by means of the optical fibers; and the cover plate is stacked on the top of the lens base, downwardly-extending fastening plates are respectively formed at peripheral edges of the cover plate, the plurality of fastening plates respectively abut against a front end of the lens base, a left side of the lens base, a right side of the lens base and a rear end of the optical fiber plug, and the lens base and the optical fiber plug are secured by means of the cover plate and the plurality of fastening plates, wherein grooves are respectively formed on three outer side walls of the lens base.

2. The optical signal transmission device according to claim 1, wherein smooth side walls are formed on the outer side of the lens base.

3. The optical signal transmission device according to claim 1, wherein an adhesive escape groove is formed on the top of the lens base, the adhesive escape groove is elongated, and the adhesive escape groove extends in the width direction of the lens base.

4. The optical signal transmission device according to claim 1, wherein a planar portion is formed on the front end face of the insert block.

5. An optical signal transmission device, comprising a lens base, a cover plate, an optical fiber plug and a PCB, wherein an insert block is formed at a front end of the optical fiber plug, a plurality of optical fibers penetrate the optical fiber plug, and end faces of the optical fibers extend toward a front side of the insert block or are flush with a front end face of the insert block; a socket is provided at a rear end of the lens base, the insert block is inserted into the socket and the two cooperate with each other; a recess is provided in the top of the lens base, and a reflective bevel is formed on the inner wall of the recess; the PCB is stacked on the bottom of the lens base, a laser is provided on the PCB, the end faces of the optical fibers and the laser both face the reflective bevel, a laser beam emitted from the laser is reflected to the end faces of the optical fibers by the reflective bevel, and optical signals are transmitted to the outside by means of the optical fibers; and the cover plate is stacked on the top of the lens base, downwardly-extending fastening plates are respectively formed at peripheral edges of the cover plate, the plurality of fastening plates respectively abut against a front end of the lens base, a left side of the lens base, a right side of the lens base and a rear end of the optical fiber plug, and the lens base and the optical fiber plug are secured by means of the cover plate and the plurality of fastening plates, wherein two support arms are formed at the rear end of the lens base, the two support arms are respectively provided on the left and right sides of the socket, and the optical fiber plug is sandwiched between the two support arms; and wherein slots are formed on inner sides of the support arms, outwardly-protruding guide blocks are respectively formed on the left and right sides of the optical fiber plug, the guide blocks are aligned with the slots on a one-to-one basis, the guide blocks are inserted into the slots and the two closely cooperate with each other.

6. The optical signal transmission device according to claim 5, wherein the guide blocks are elongated, and the guide blocks extend in a front and back direction of the optical fiber plug.

7. The optical signal transmission device according to claim 5, wherein a bottom recess is formed on a lower end face of the lens base, the PCB covers the bottom recess, and the laser is located inside the bottom recess.

8. The optical signal transmission device according to claim 7, wherein the lens base comprises a plurality of second lenses arranged side by side, the second lenses are located inside the bottom recess, the second lenses are aligned with the optical fibers on a one-to-one basis, and the second lenses protrude in the direction of the laser.

9. The optical signal transmission device according to claim 5, wherein the lens base comprises a plurality of first lenses arranged side by side, the plurality of first lenses are all located inside the socket, the first lenses are aligned with the optical fibers on a one-to-one basis, and the first lenses protrude in the direction of the end faces of the optical fibers.

10. The optical signal transmission device according to claim 5, wherein the cover plate is made of plastic or metal.

11. The optical signal transmission device according to claim 5, wherein two downwardly-extending positioning posts are formed at the bottom of the lens base, and the two positioning posts are respectively close to the left and right ends of the lens base.

12. The optical signal transmission device according to claim 5, wherein a plurality of optical fiber insertion holes arranged side by side are formed in the optical fiber plug, and the plurality of optical fibers respectively pass through the plurality of optical fiber insertion holes.

13. The optical signal transmission device according to claim 12, wherein optical fiber guide slots are formed on the optical fiber plug, the optical fiber guide slots are aligned with the optical fiber insertion holes on a one-to-one basis, and the optical fiber guide slots are in communication with the rear ends of the optical fiber insertion holes.

14. The optical signal transmission device according to claim 12, wherein the optical fiber insertion holes are separate through holes, and a gap is provided between two adjacent optical fiber insertion holes.

15. The optical signal transmission device according to claim 12, wherein side portions of two adjacent optical fiber insertion holes are in communication with each other.

16. The optical signal transmission device according to claim 12, wherein two protruding blocks are formed on the front end face of the insert block, the two protruding blocks are respectively located at the left and right ends of the insert block, and the optical fiber insertion holes are located between the two protruding blocks.

17. The optical signal transmission device according to claim 12, wherein two positioning jacks are formed in the socket, the two positioning jacks are respectively close to the left and right ends of the socket, two positioning pins protruding forward are formed on the front end face of the insert block, the positioning pins are aligned with the positioning jacks on a one-to-one basis, and the positioning pins are inserted into and cooperate with the positioning jacks.

\* \* \* \* \*